UNITED STATES PATENT OFFICE.

SAMUEL C. BISHOP, OF NEW YORK, N. Y., ASSIGNOR TO THE BISHOP GUTTA PERCHA COMPANY, OF SAME PLACE.

IMPROVED COMPOSITION FOR INSULATING TELEGRAPH-WIRES.

Specification forming part of Letters Patent No. 46,750, dated March 7, 1865.

*To all whom it may concern:*

Be it known that I, SAMUEL C. BISHOP, of the city, county, and State of New York, have invented a new and Improved Composition for Insulating Telegraph-Wires; and I do hereby declare that the following is a full, clear, and exact description of the same.

The object of this invention is a composition which will serve to insulate telegraph-wire running under ground, and particularly under water, and to effect this purpose a composition must be used which is absolutely impervious to water, and which shall protect the wire, even if the same should be immersed to a considerable depth.

The composition consists of gutta-percha or india-rubber and paraffine mixed with rosin and wheat-flour; or, instead of these two latter ingredients, white oxide of zinc, catechu, and gelatine or glue may be used. The proportion in which I mix these ingredients together is about as follows: gutta-percha or india-rubber, four parts; paraffine, one part; wheat-flour, two parts; rosin, one part; or, instead of this, gutta-percha or india-rubber, six parts; paraffine, two parts; white oxide of zinc, one part; catechu, (or any other material containing tannic acid,) one part; gelatine or glue, two parts. These ingredients are mixed together either in solution or by heated rollers, and the telegraph-wire is coated with it in any desirable manner.

It will be observed that in both mixtures given above the gutta-percha or india-rubber and paraffine form the basis. In the first composition wheat-flour and rosin are mixed with the same, and these ingredients are replaced in the second composition by tannate of gelatine formed by mixing glue with catechu or any other material containing tannic acid, and by white oxide of zinc. The tannate of gelatine is particularly intended to render the composition impervious to water; but this object is also effected by mixing the gutta-percha or india-rubber and paraffine with rosin and wheat-flour.

I claim as new and desire to secure by Letters Patent—

A composition for insulating telegraph-wire, consisting of gutta-percha or india-rubber and paraffine mixed with either rosin and wheat-flour or with a tannate of gelatine and white oxide of zinc, substantially in the manner and about in the proportion herein set forth.

SAM. C. BISHOP.

Witnesses:
HENRY S. VALENTINE,
M. M. LIVINGSTON.